United States Patent Office 3,314,983
Patented Apr. 18, 1967

3,314,983
DITHIOCYANO DERIVATIVES OF VINYL CYCLOHEXENE-3
Eldon E. Stahly, 2812 NE. 27th St., Pompano Beach, Fla. 33064
No Drawing. Filed July 24, 1963, Ser. No. 297,192
3 Claims. (Cl. 260—454)

This invention relates to new compositions of matter, dithiocyano derivatives of vinyl cyclohexene-3, and a method for making them. The compositions are 1,2-dithiocyano ethyl-cyclohexene-3 having the formula:

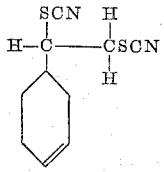

and vinyl-3,4-dithiocyano cyclohexane, having the formula:

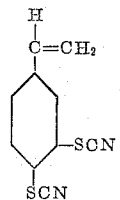

The dithiocyano derivatives of vinyl cyclohexene-3 are useful separately or in mixture with each other as a pesticide, e.g. for killing flies and ants, and as a repellent, e.g. for repelling cockroaches and the like. The mixture serves as a useful intermediate for oxidation to a disulfonic acid which is in turn useful in the detergent industry. Isomerization of either compound to the corresponding diisothiocyanate and reduction can produce an analogous useful diamino composition for preparation of polyamide type of resins. Further, a dilute benzene solution of the dithiocyanated vinylcyclohexene-3 can be catalytically reacted with lead dithiocyanate to produce a tetrathiocyano-substituted ethylcyclohexane, also useful as a pesticide.

The novel compounds of this invention may be formed by reacting vinyl cyclohexene-3 with nascent thiocyanogen, i.e. thiocyanogen in which (—SCN) groups are present as well as the $(SCN)_2$ molecule. The nascent thiocyanogen may be obtained, for example, by the in situ reaction of copper sulfate and sodium thiocyanate, the resulting first-formed cupric thiocyanate releasing nascent thiocyanogen as it is converted to cuprous thiocyanate. Alternatively, the nascent thiocyanogen may be produced by reacting a suspension of cupric sulfate with sodium thiocyanate in glacial acetic acid or by adding bromine to a suspension of plumbous thiocyanate in benzene. Both of the latter reactions must be conducted under anhydrous conditions.

The reaction may take place in a solvent medium e.g. ethanol, at a temperature between about 0 and 100° C. for a period of about 5 to 100 minutes. The product may then be recovered from the solution by extraction with a suitable solvent, e.g. benzene. Preferably, the reaction takes place at a temperature between about room temperature and 75° C. for a period of about 30 to 50 minutes. Both isomers are formed by the reaction because there may occur addition first at either the vinyl group or the ring unsaturation, and, when two thiocyano-groups have been introduced in the vinyl cyclohexene-3 structure, precipitation occurs, and hence, addition at the other double bond is blocked. The compounds formed by the reaction are 1,2-dithiocyanoethyl-cyclohexene-3 and vinyl-3,4-dithiocyanocyclohexane. These compounds may be separated, for example, by chromatography or may be retained as a mixture.

The following example of the invention is illustrative only and not limiting.

One hundred seventy-five parts by weight of sodium thiocyanate were suspended in 450 parts by weight of 95% ethanol containing 27 grams of vinylcyclohexene-3 at about room temperature, i.e. 26° C. A solution of 260 parts by weight of copper sulfate pentahydrate in 475 parts by weight of water at 70° C. was added to the suspension dropwise over a period of 40 minutes while stirring vigorously. The dark brown-colored mixture initially formed gradually turned to light brown, grey and light yellow. At the end of the copper sulfate addition, the temperature of the ethanol solution was 46° C. Stirring was continued for 25 minutes. Then, 435 parts benzene by weight were added; stirring was continued for 10 minutes and the mixture was filtered. The benzene layer was separated from the filtrate, and the cuprous thiocyanate residue on the filter paper was recombined with the water layer. The mixture was then extracted with 435 parts by weight of benzene and filtered. The benzene layer was separated from the filtrate. The combined benzene layers were washed with 250 parts by weight of 10% soda ash solution, filtered and evaporated at 30° C. and 2 mm. Hg pressure. Twenty parts by weight of oil remained of $D_4^{20}$ 1.170 and $n_D^{30}$ 1.560. At 0° C. a few crystals formed which remelted at 25° C. Analysis of the sample proved it to have 12.0% sulfur and 26.5% nitrogen corresponding to the dithiocyanated derivative of vinylcyclohexene-3 of 92 to 95% purity.

It is claimed:

1. A compound of the formula

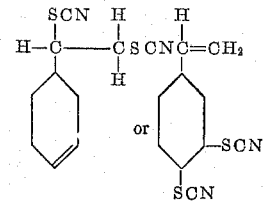

2. 1,2-dithiocyanoethyl-cyclohexene-3.
3. Vinyl-3,4-dithiocyanocyclohexane.

References Cited by the Examiner
UNITED STATES PATENTS
2,639,267  5/1953  Pfann _____ 260—454 X CHARLES B. PARKER, *Primary Examiner.*
DALE R. MAHANAND, *Assistant Examiner.*